(12) United States Patent
Suzuki

(10) Patent No.: US 9,759,316 B2
(45) Date of Patent: Sep. 12, 2017

(54) TRANSMISSION HYDRAULICS CONTROLLER

(71) Applicant: DENSO CORPORATION, Kariya, Aichi-pref. (JP)

(72) Inventor: Fuminori Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/952,849

(22) Filed: Nov. 25, 2015

(65) Prior Publication Data

US 2016/0153554 A1   Jun. 2, 2016

(30) Foreign Application Priority Data

Nov. 28, 2014   (JP) .................................. 2014-240911

(51) Int. Cl.
*F16H 61/32* (2006.01)
*F16H 61/02* (2006.01)
*F16H 61/00* (2006.01)

(52) U.S. Cl.
CPC ......... *F16H 61/32* (2013.01); *F16H 61/0206* (2013.01); *F16H 61/0286* (2013.01); *F16H 2061/0043* (2013.01); *F16H 2061/326* (2013.01)

(58) Field of Classification Search
CPC ...................................................... F16H 61/32
See application file for complete search history.

(56) References Cited

U.S. PATENT DOCUMENTS

| 5,971,889 A | 10/1999 | Ohashi et al. |
| 2005/0056515 A1* | 3/2005 | Nickerson ............... F16D 48/04 |
| | | 192/48.601 |
| 2006/0103339 A1* | 5/2006 | Yamada .................. F16H 61/32 |
| | | 318/623 |

FOREIGN PATENT DOCUMENTS

| JP | 3-186658 | 8/1991 |
| JP | 5-133455 | 5/1993 |
| JP | 8-028694 | 2/1996 |
| JP | 2007-64268 | 3/2007 |
| JP | 2011-231841 | 11/2011 |
| JP | 2014-055624 | 3/2014 |

\* cited by examiner

*Primary Examiner* — Derek D Knight

(74) *Attorney, Agent, or Firm* — Nixon & Vanderhye P.C.

(57) ABSTRACT

A normal oil passage that supplies hydraulic pressure to a friction engagement element through a hydraulic control valve, and a bypass oil passage that supplies hydraulic pressure to the friction engagement element while bypassing the hydraulic control valve, are provided. By switching an operative position of a manual valve, a hydraulic pressure supply route to the friction engagement element is switched between the normal oil passage and the bypass oil passage. By switching to the bypass oil passage, the hydraulic pressure supplied to the friction engagement element is not affected by operation of the hydraulic control valve, and a cleaning control may be performed to cause the hydraulic control valve to perform a cleaning operation. Accordingly, even if an operation amount of the cleaning control for the hydraulic control valve is increased, malfunctions by the friction engagement element will not occur.

5 Claims, 7 Drawing Sheets

NORMAL OIL PASSAGE

BYPASS OIL PASSAGE

TRANSMISSION HYDRAULICS CONTROLLER

CROSS REFERENCE TO RELATED APPLICATION

The present application is based on Japanese Patent Application No. 2014-240911 filed on Nov. 28, 2014, disclosure of which is incorporated herein by reference.

TECHNICAL FIELD

The present disclosure relates to a hydraulics controller for a transmission that includes a manual valve and a hydraulic control valve. The manual valve switches a hydraulic circuit of hydraulic oil for friction engagement elements of the transmission. The hydraulic control valve controls a hydraulic pressure applied to the friction engagement elements.

BACKGROUND

JP 2007-064268 A describes an exemplary automatic transmission mounted on a vehicle. In this automatic transmission, an engine rotation-driven oil pump supplies hydraulic pressure to a hydraulic control circuit. A hydraulic valve and a manual valve are provided in the hydraulic control circuit to switch a hydraulic circuit and to control a hydraulic pressure. Here, the hydraulic pressure is applied to friction engagement elements (e.g., a brake or a clutch) of a transmission mechanism. As a result, gear shifting, or range shifting, is performed.

This kind of automatic transmission includes a hydraulic control system, in which when foreign substances (such as iron particles or aluminum particles) accumulate within a hydraulic control valve (e.g., a solenoid or such), the operability of the hydraulic control valve may degrade. In the worst case, there is a chance that the hydraulic control valve may lock up due to jamming by the foreign substances.

For this reason, when the vehicle is stopped, a cleaning control is performed to cause the hydraulic control valve to perform a cleaning operation (for example, an operation where a spool valve repeatedly reciprocates). As a result, foreign substances are expelled from the hydraulic control valve, and accumulation of foreign substances within the hydraulic control valve may be prevented.

SUMMARY

In order to improve the effectiveness of the cleaning control of the hydraulic control valve in preventing foreign substance accumulation, it is desirable to increase an operation amount of the hydraulic control valve cleaning control (e.g., a stroke amount of the reciprocation of the spool valve).

However, in the hydraulic control system of conventional automatic transmissions, as the operation amount of the hydraulic control valve cleaning control is increased, a hydraulic pressure applied to friction engagement elements is also increased accordingly. As a result, there is a chance that the friction engagement elements may malfunction. For this reason, it is necessary to suppress the operation amount of the hydraulic control valve cleaning control, in order to suppress fluctuations in the hydraulic pressure applied to the friction engagement elements so as to prevent malfunctions by the friction engagement elements. Accordingly, the operation amount of the hydraulic control valve cleaning control may not be increased, and there is a concern that the hydraulic control valve cleaning control may not sufficiently prevent foreign substance accumulation.

In view of the above, it is an object of the present disclosure to provide a transmission hydraulics controller that does not cause friction engagement elements to malfunction, while improving the effectiveness of a hydraulic control valve cleaning control in preventing foreign substance accumulation.

In view of the above, according to the present disclosure, there is provided a transmission hydraulics controller for a transmission including i) a manual valve that switches a hydraulic circuit for hydraulic oil of a friction engagement element of the transmission, ii) a hydraulic control valve that controls a hydraulic pressure applied to the friction engagement element, and iii) a range switch mechanism that is driven by an electric actuator and switches an operative position of the manual valve to switch a range of the transmission, the transmission hydraulics controller including a normal oil passage that supplies hydraulic pressure to the friction engagement element through the hydraulic control valve, and a bypass oil passage that supplies hydraulic pressure to the friction engagement element while bypassing the hydraulic control valve, where when the operative position of the manual valve is switched, a hydraulic pressure supply route to the friction engagement element is switched between the normal oil passage and the bypass oil passage According to this configuration, when the hydraulic pressure supply route to the friction engagement element is switched to the normal oil passage, the hydraulic control valve is able to control the hydraulic pressure applied to the friction engagement element. Conversely, when the hydraulic pressure supply route to the friction engagement element is switched to the bypass oil passage, hydraulic pressure is supplied to the friction engagement element, but this hydraulic pressure is not affected by the operation of the hydraulic control valve. In this state, even if the cleaning control is performed to cause the hydraulic control valve to perform the cleaning operation, the hydraulic pressure applied to the friction engagement element is unchanged. Accordingly, even if an operation amount of the cleaning control on the hydraulic control valve is increased, malfunctions by the friction engagement element will not occur. As a result, without causing the friction engagement element to malfunction, the operation amount of the cleaning control on the hydraulic control valve may be increased, and the effectiveness of the hydraulic control valve cleaning control in preventing foreign substance accumulation may be improved.

Moreover, the electric actuator, which is a motive power source for the range switch mechanism, is used to switch the operative position of the manual valve to switched between the normal oil passages and the bypass oil passages. As a result, a dedicated motive power source for switching between the normal oil passages and the bypass oil passages is not necessary, and the system may further satisfy low cost and energy efficiency demands.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
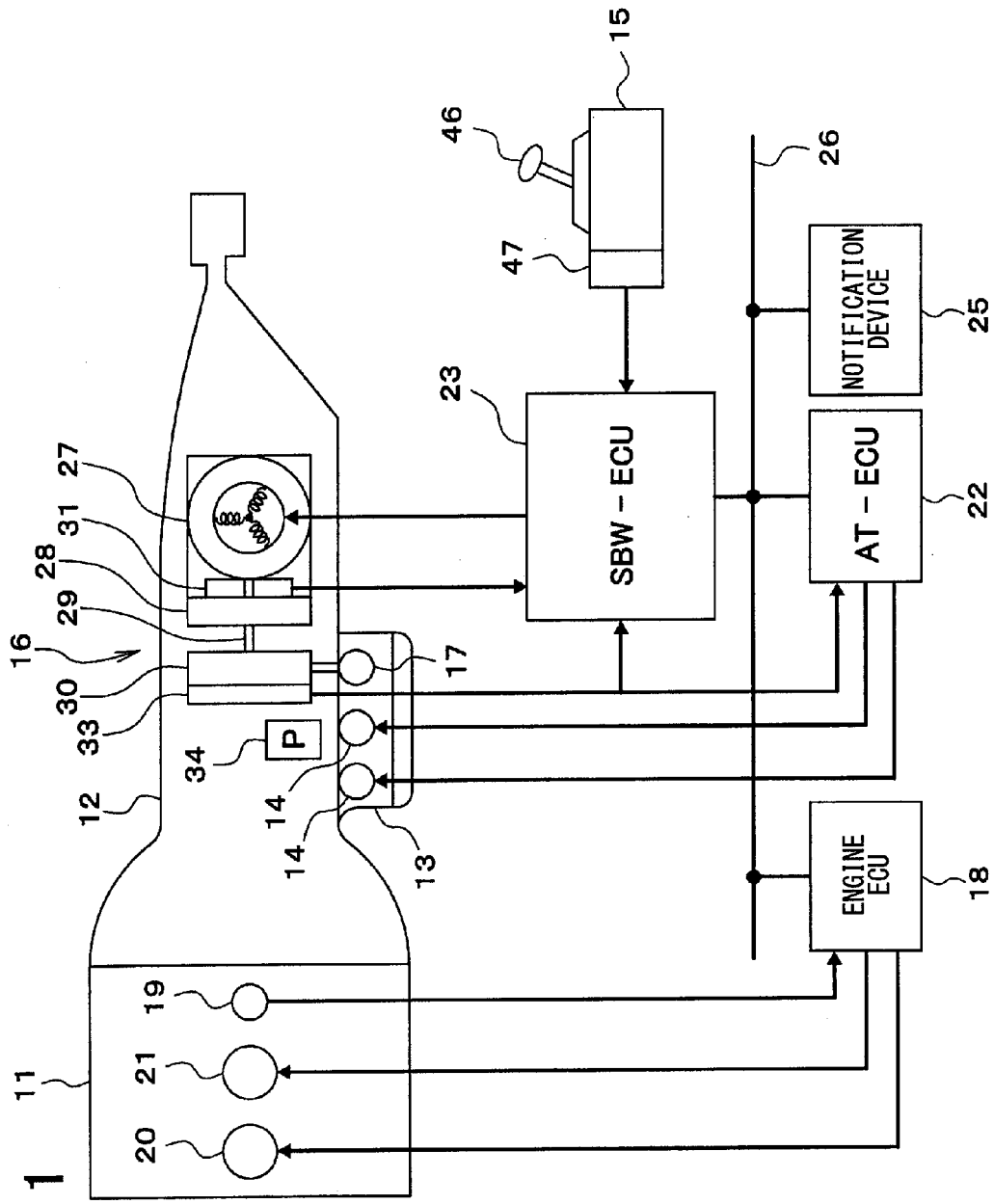
FIG. 1 is an outline view showing an automatic transmission control system of the present disclosure.

Hereinafter, an embodiment which embodies the present disclosure will be explained in detail.

First, an outline configuration of a vehicular autocratic transmission control system will be explained with reference to FIG. 1.

An output shaft (e.g., a crank shaft) of an engine 11, which is the power source of a vehicle, is coupled to an input shaft of an automatic transmission 12. The automatic transmission 12 includes a transmission gear mechanism (not illustrated) and a hydraulic control circuit 13. The transmission gear mechanism includes a plurality of friction engagement elements 48 (see FIGS. 4 and 5) such as a clutch or a brake for switching a gear position (i.e., a transmission gear ratio). Further, the hydraulic control circuit 13 includes hydraulic control valves 14 (e.g. solenoid valves) and a manual valve 17. The hydraulic control valves 14 control a hydraulic pressure applied to the friction engagement elements 48. The manual valve 17 switches a hydraulic circuit for a hydraulic oil applied to the friction engagement elements 48. A range selector 15 is coupled to a range switch mechanism 16. When the range selector 15 is operated, the range switch mechanism 16 drives the manual valve 17.

Further, the automatic transmission 12 includes an oil pump 34 (which may be, for example, a vane-type oil pump) that is rotatably driven by the engine 11 (e.g., driven by the rotation of the input shaft of the transmission gear mechanism). The hydraulic oil discharged by the oil pump 34 is supplied to the hydraulic control circuit 13, thereby supplying hydraulic pressure to the hydraulic control circuit 13.

An engine electronic control unit (ECU) 18 controls the engine 11. Specifically, the engine ECU 18 controls a throttle opening (i.e., an opening angle of a throttle valve) of a throttle device 20 and a fuel injection amount of a fuel injection valve 21 based on output signals such as an accelerator position (i.e., a depression amount of an accelerator pedal) detected by an accelerator sensor 19.

An automatic transmission ECU (AT-ECU) 22 controls a gear shift operation of the automatic transmission 12. Specifically, the AT-ECU 22 switches a gear position of the automatic transmission 12 to a target gear position by controlling each hydraulic control valve 14 in the hydraulic control circuit 13 to open and close, thereby controlling the hydraulic pressure applied to the friction engagement elements 48.

A shift-by-wire ECU (SBW-ECU) 23 controls a range switch operation of the automatic transmission 12. Specifically, the SBW-ECU 23 controls a motor 27 of the range switch mechanism 16 based on a requested range signal. The requested range signal corresponds to an operation of an operation lever 46 (i.e., an operation portion) of the range selector 15. Accordingly, the SBW-ECU 23 switches the manual valve 17 according to a range switch operation performed by a driver, thereby switching a shift range of the automatic transmission 12. The range selector 15, the range switch mechanism 16, and the SBW-ECU 23 form a shift-by-wire system.

The engine ECU 18, the AT-ECU 22, the SBW-ECU 23, and a notification device 25 are connected together by a communication line 26 such as an on-board local area network (LAN) circuit, and send and receive necessary information to each other through, e.g., controller area network (CAN) communication.

Figure 2:
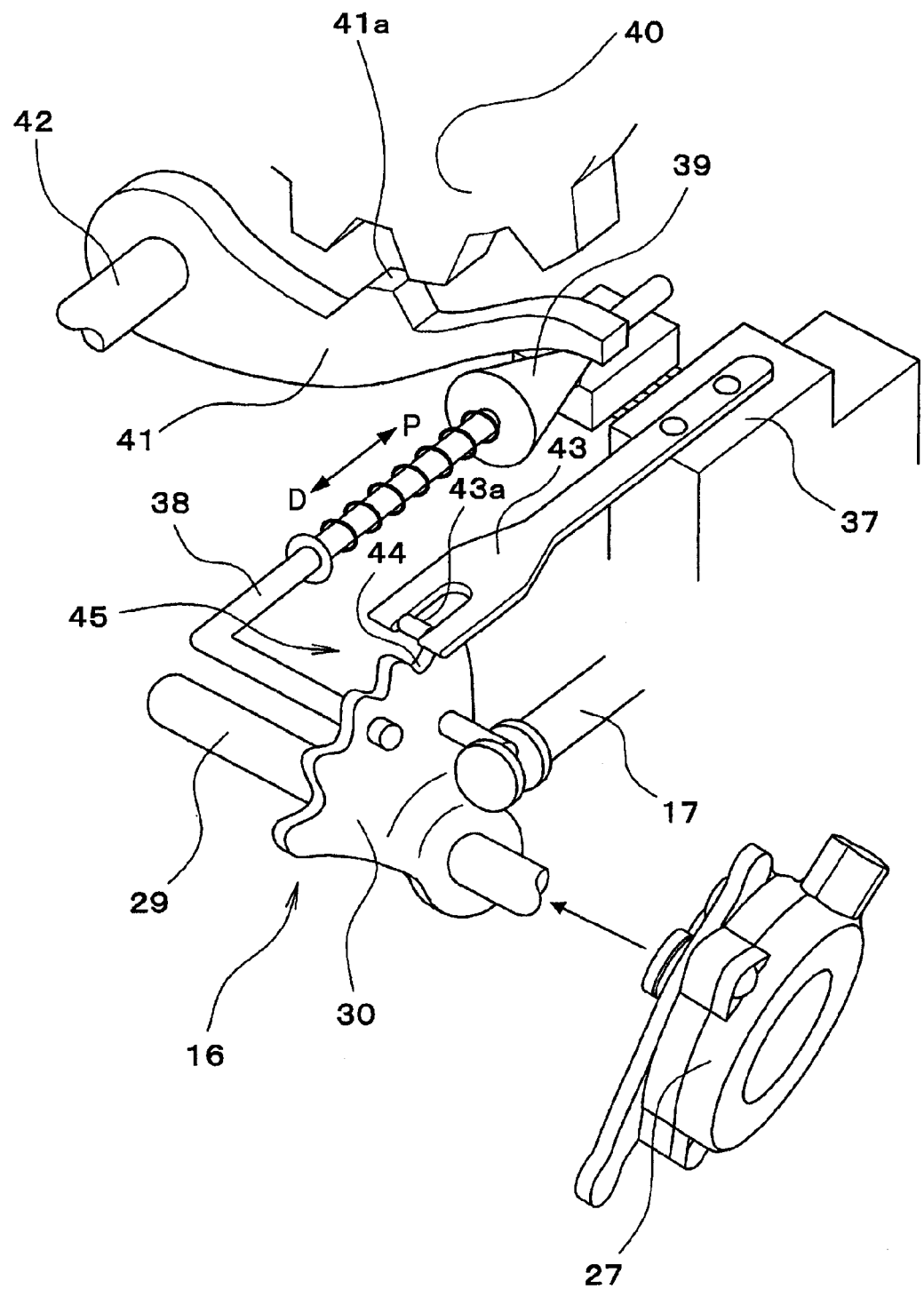
FIG. 2 is a perspective view showing a range switch mechanism.

As shown in FIG. 2, the range switch mechanism 16 may be a four-position type range switch mechanism that switches the shift range of the automatic transmission 12 between a P range (i.e., parking range), an R range (i.e., a reverse range), an N range (i.e., a neutral range), and a D range (i.e., a drive range). The motor 27, which is an electric actuator, acts as a motive power source for the range switch mechanism 16. The motor 27 may be, for example, a switched reluctance motor. A rotating shaft of the motor 27 is coupled to a manual shaft 29 through a reduction mechanism 28 (refer to FIG. 1). The manual shaft 29 is fixed to a detent lever 30. Further, the detent lever 30 is coupled to the manual valve 17. Here, the manual valve 17 is linearly displaced according to a rotation of the detent lever 30. The hydraulic circuit of the automatic transmission 12 is switched by the manual valve 17, thereby switching the shift range. According to the above, the shift range of the automatic transmission 12 may be controlled according to the rotation angle of the motor 27.

Further, an L-shaped parking rod 38 is fixed to the detent lever 30. A cone body 39 is disposed at the leading end of the parking rod 38, and abuts a lock lever 41. The lock lever 41 rotates about a shaft 42 according to the position of the cone body 39, thereby locking and unlocking a parking gear 40. The parking gear 40 is disposed in the automatic transmission 12, and when the parking gear 40 is locked with the lock lever 41, the driving wheels of the vehicle are held in a stopped state (i.e., a parking state).

Figure 3:
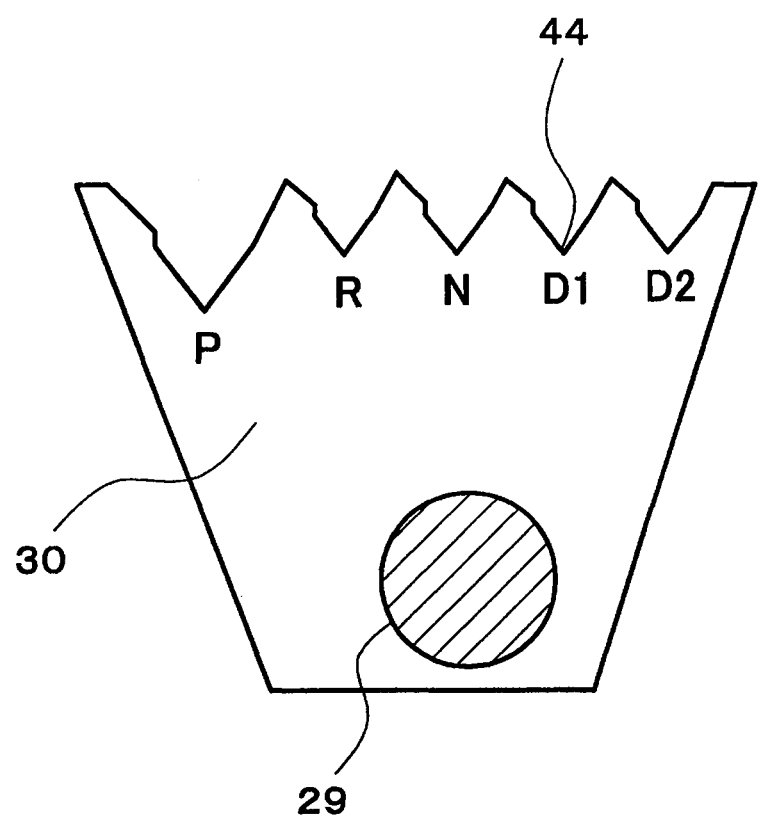
FIG. 3 is a front view showing a detent lever.

A detent spring 43 is fixed to a support base 37 to retain the detent lever 30 in each of the P, R, N, and D ranges. Meanwhile, the detent lever 30 includes a plurality of range retention recesses 44 corresponding to each of the P, R, N, and a ranges. Further, in the present embodiment, the D range includes a D1 range and a D2 range, and the detent lever 30 includes a respective range retention recess 44 for each of the D1 range and the D2 range (refer to FIG. 3).

An engagement portion 43a is provided at the tip of the detent spring 43. When the engagement portion 43a is engaged in each of the range retention recesses 44 of the detent lever 30, the detent lever 30 is retained at the position of the each range. The detent lever 30 and the detent spring 43 form a detent mechanism 45 that engages and maintains the rotational position of the detent lever 30 at each range (in other words, maintaining the range switch mechanism 16 at each range).

In the P range, the parking rod 38 is displaced toward the lock lever 41, and a wide portion of the cone body 39 raises the lock lever 41. As a result, a protrusion portion 41a of the lock lever 41 engages the parking gear 40 to lock the parking gear 40. Accordingly, an output shaft of the automatic transmission 12 (in other words, the driving wheels) is held in a locked state, i.e., a parked state.

When not in the P range, the parking rod 38 is displaced away from the lock lever 41, and the wide portion of the cone body 39 is pulled out from the lock lever 41, thereby lowering the lock lever 41. As a result, the protrusion portion 41a of the lock lever 41 is disconnected from the parking gear 40 to unlock the parking gear 40. Accordingly, the output shaft of the automatic transmission 12 is maintained in a rotatable state, i.e., a movable state.

As shown in FIG. 1, the motor 27 includes an encoder 31, which is a rotation angle sensor, that detects the rotation angle (or rotation position) of a rotor of the motor 27. The encoder 31 may be, for example, a magnetic rotary encoder. The encoder 31 is synchronized with the rotation of the rotor of the motor 27, and outputs a pulse signal to the SBW-ECU 23 after every predetermined angle. The SBW-ECU 23 counts the pulse signals from the encoder 31 and, based on this count value (hereinafter referred to as an "encoder count value"), switches a conduction phase of the motor 27 in a predetermined order to drive the motor 27. As described above, the shift range of the automatic transmission 12 is changed according to the rotation angle of the motor 27. Accordingly, the encoder count value indirectly indicates the actual shift range.

Further, a rotation sensor 33 is provided to detect the rotation angle (or rotation position) of the manual shaft 29 or the detent lever 30. The rotation sensor 33 may be, for example, a potentiometer, and outputs a voltage according to the rotation angle of the manual shaft 29 or the detent lever 30. Based on this output voltage, one of the P range, R range, N range, and D range may be identified as the actual shift range.

The range selector 15 includes the operation lever 46 and a selector sensor 47. The operation lever 46 is used by the driver to select a range, and the selector sensor 47 outputs a requested range signal according the operation of the operation lever 46.

The SBW-ECU 23 switches the target range according to the requested range signal output by the range selector 15 (or more specifically, the selector sensor 47). Then, the SBW-ECU 23 uses the encoder count value to drive the motor 27 to rotate to a target rotation position (or target count value) corresponding to the target range, thereby switching the shift range to the target range.

Next, the configuration of the hydraulic control circuit 13 of the automatic transmission 12 will be explained with reference to FIGS. 4 and 5. Specifically, an explanation will be provided with respect to two of the friction engagement elements 48 which are in an engaged state when the automatic transmission is in a predetermined gear position (e.g., first gear).

The hydraulic control circuit 13 includes normal oil passages 49 and bypass oil passage 50. The normal oil passages 49 supply hydraulic pressure to the friction engagement elements 48 through respective hydraulic control valves 14. The bypass oil passages 50 supply hydraulic pressure to the friction engagement elements 48 while bypassing the respective hydraulic control valves 14. The normal oil passages 49 merge with the bypass oil passages 50 before connecting to the friction engagement elements 48.

The hydraulic control circuit 13 is configured such that by switching the operative position of the manual valve 17, the hydraulic pressure supply route to the friction engagement elements 48 is switched between the normal oil passages 49 and the bypass oil passages 50.

Specifically, a sleeve 51 of the manual valve 17 includes an input port 52, a normal port 53, a bypass port 54, and a drain port 55. Hydraulic pressure is supplied from the oil pump 34 and introduced through the input port 52. The normal port 53 is in fluid communication with the normal oil passages 49. The bypass port 54 is in fluid communication with the bypass oil passages 50.

When the manual valve 17 is driven by the motor 27, which acts as a motive power source for the range switch mechanism 16, the manual valve 17 moves in the axial direction. Here, a D range position of the manual valve 17 includes two switchable positions, a D1 range position (i.e., when the engagement portion 43*a* of the detent spring 43 is engaged in the range retention recess 44 of the detent lever 30 for the D1 range) and a D2 range position (i.e., when the engagement portion 43*a* of the detent spring 43 is engaged in the range retention recess 44 of the detent lever 30 for the D2 range). Regardless of whether the manual valve 17 is in the D1 range position or the D2 range position, the hydraulic circuit of the automatic transmission 12 is maintained in the D range hydraulic circuit, such that the automatic transmission 12 is maintained in the D range.

Figure 4:
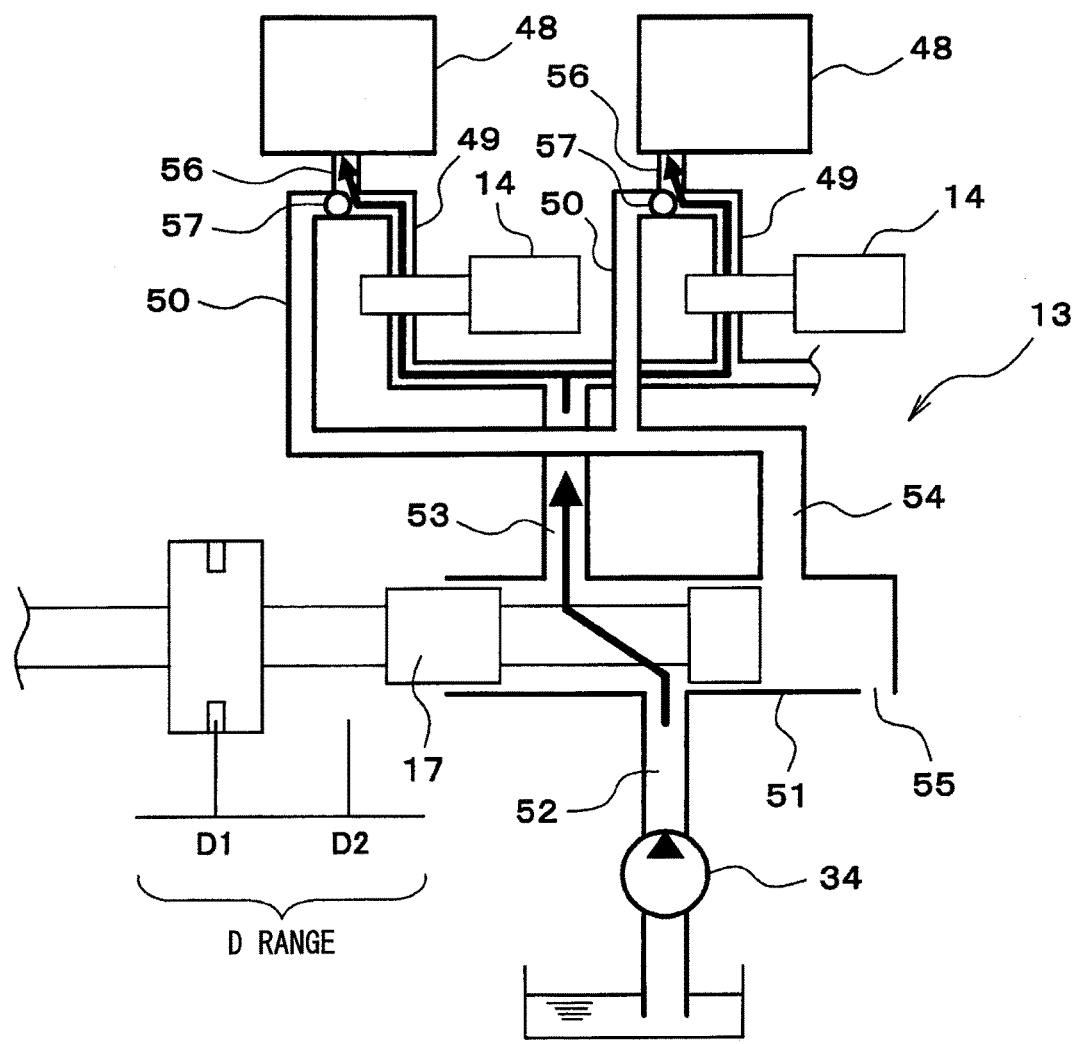
FIG. 4 is a view showing a normal oil passage switched state.

As shown in FIG. 4, when the manual valve 17 moves to the D1 range position (i.e., a first operative position), an oil passage from the input port 52 to the normal port 53 is opened, and an oil passage from the input port 52 to the bypass port 54 is closed. Accordingly, the hydraulic pressure supply route to the friction engagement elements 48 is switched to the normal oil passages 49. As a result, the hydraulic pressure introduced from the input port 52 into the sleeve 51 is supplied through the normal port 53 and the normal oil passages 49 to the friction engagement elements 48.

Figure 5:
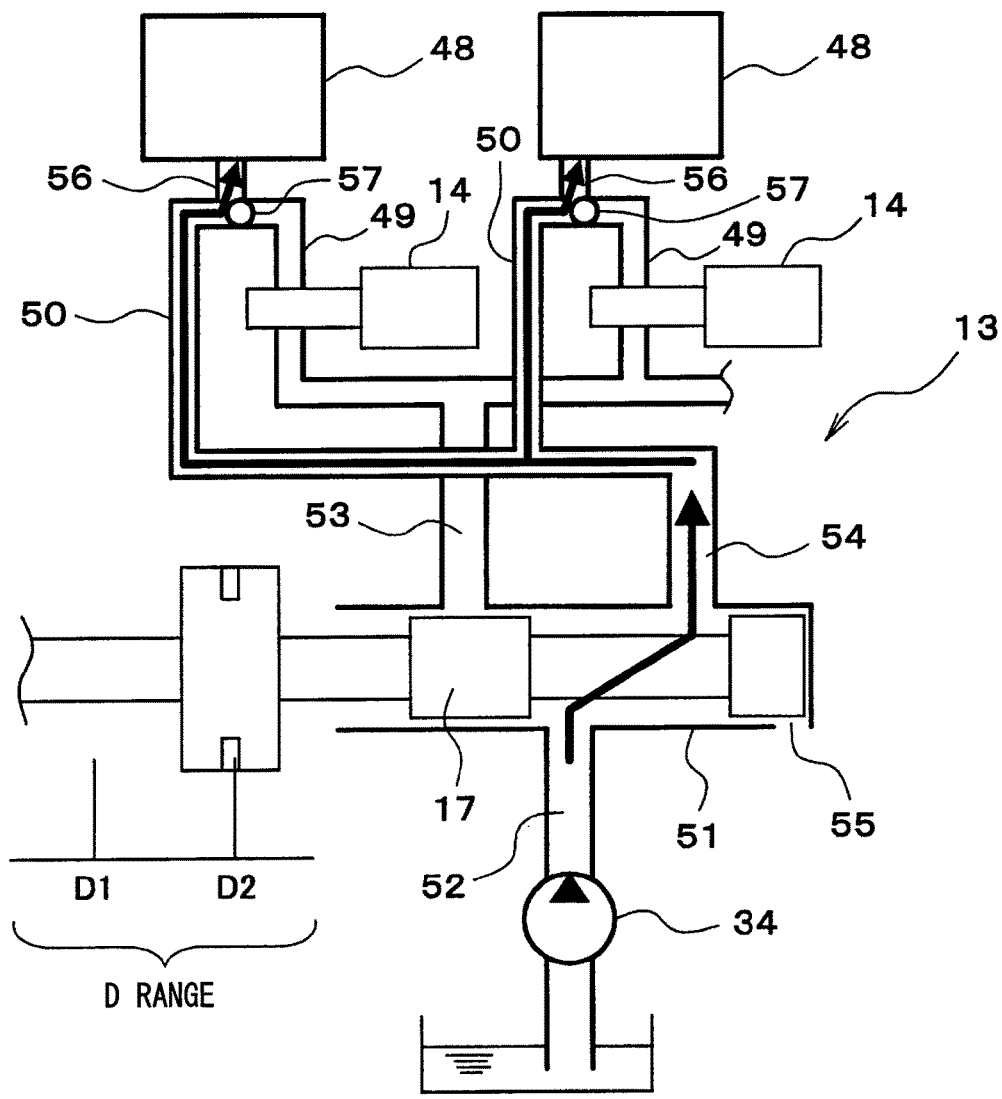
FIG. 5 is a view showing a bypass oil passage switched state.

Conversely, as shown in FIG. 5, when the manual valve 17 moves to the D2 range position (i.e., a second operative position), the oil passage from the input port 52 to the bypass port 54 is opened, and the oil passage from the input port 52 to the normal port 53 is closed. Accordingly, the hydraulic pressure supply route to the friction engagement elements 48 is switched to the bypass oil passages 50. As a result, the hydraulic pressure introduced from the input port 52 into the sleeve 51 is supplied through the bypass port 54 and the bypass oil passages 50 to the friction engagement elements 48.

Further, two-way balls 57, which act as dynamic closure members, are provided at merging portions 56 of the normal oil passages 49 and the bypass oil passages 50. When the hydraulic pressure supply route to the friction engagement elements 48 is switched to the normal oil passages 49, the hydraulic pressure in the normal oil passages 49 causes the two-way balls 57 to move to a position that closes the bypass oil passages 50. Conversely, when the hydraulic pressure supply route to the friction engagement elements 48 is switched to the bypass oil passages 50, the hydraulic pressure in the bypass oil passages 50 causes the two-way balls 57 to move to a position that closes the normal oil passages 49.

Accordingly, as shown in FIG. 4, when the operative position of the manual valve 17 is switched to the D1 range position and the hydraulic pressure supply route to the friction engagement elements 48 is switched to the normal oil passages 49, the two-way balls 57 at the merging portions 56 open the normal oil passages 49 and close the bypass oil passages 50. Conversely, as shown in FIG. 5, when the operative position of the manual valve 17 is switched to the D2 range position and the hydraulic pressure supply route to the friction engagement elements 48 is switched to the bypass oil passages 50, the two-way balls 57 at the merging portions 56 open the bypass oil passages 50 and close the normal oil passages 49.

Further, in the present embodiment, the SBW-ECU 23 performs the following control operation by executing an oil passage switching control routine shown in FIG. 6, which will be described later.

Specifically, the SBW-ECU 23 determines whether predetermined conditions are met such that the automatic transmission 12 is likely to remain in a predetermined gear position (e.g., first gear). If the predetermined conditions are not met, the operative position of the manual valve 17 is switched to the D1 range position. If the predetermined conditions are met, the operative position of the manual valve 17 is switched to the D2 range position.

Accordingly, when the predetermined conditions are not met (in other words, when the automatic transmission 12 is unlikely to be maintained in the predetermined gear position), the operative position of the manual valve 17 is switched to the D1 range position and the hydraulic pressure supply route to the friction engagement elements 48 is switched to the normal oil passages 49. As a result, the hydraulic control valves 14 are able to control the hydraulic pressure applied to the friction engagement elements 48.

Conversely, when the predetermined conditions are met (in other words, when the automatic transmission 12 is likely to be maintained in the predetermined gear position), the operative position of the manual valve 17 is switched to the D2 range position and the hydraulic pressure supply route to the friction engagement elements 48 is switched to the bypass oil passages 50. As a result, hydraulic pressure is supplied to the friction engagement elements 48, but this hydraulic pressure is not affected by the operation of the hydraulic control valves 14.

Furthermore, when the operative position of the manual valve 17 is switched to the D2 range position, by performing a cleaning control that causes the hydraulic control valves 14 to perform a cleaning operation (e.g., an operation where a spool valve repeatedly reciprocates), foreign substances are expelled from the hydraulic control valves 14, and accumulation of foreign substances within the hydraulic control valves 14 may be prevented.

Next, the details of the oil passage switching control routine performed by the SBW-ECU 23 will be explained with reference to FIG. 6.

Figure 6:
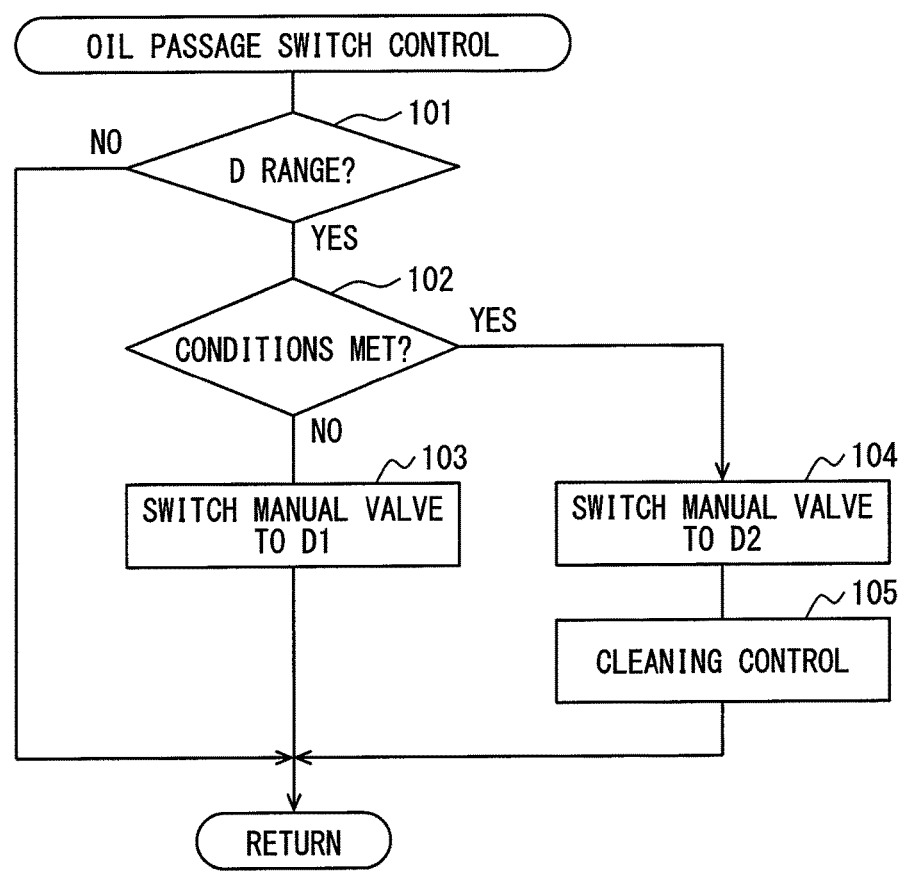
FIG. 6 is a flow chart showing the processing flow of an oil passage switching control routine.

When the SBW-ECU 23 is powered on (i.e., when the ignition switch is on), the SBW-ECU 23 periodically and repeatedly performs the oil passage switching control routine of FIG. 6. As such, the SBW-ECU 23 acts as a control unit. The present control routine beings at step 101; where it is determined whether the current shift range is the D range (i.e., whether the manual valve 17 is in the D range position). At step 101, if it is determined that the current shift range is not the D range, the processing of step 102 and beyond is not performed, and the present control routine terminates.

Conversely, if it is determined at step 101 that the current shift range is the D shift range, then the control routine continues to step 102. At step 102, it is determined whether predetermined conditions are met such that the automatic transmission 12 is likely is be maintained in a predetermined gear position (e.g., first gear). For example; it may be determined whether the engine 11 is in an idle state and breaks are engaged (that is, a break pedal is being depressed). However, the predetermined conditions are not limited to this example. Other examples include determining whether the vehicle is stopped and the breaks are engaged, or simply determined whether the vehicle is stopped.

At step 102, if it is determined that the predetermined conditions are not met (in other words, when the automatic transmission 12 is unlikely to be maintained in the predetermined gear position), then the control routine proceeds to step 103. At step 103, the operative position of the manual valve 17 is switched to the D1 range position, and the hydraulic pressure supply route to the friction engagement elements 48 is switched to the normal oil passages 49. Accordingly, the hydraulic control valves 14 are able to control the hydraulic pressure applied to the friction engagement elements 48 and thereby switch gear positions.

Conversely, if it is determined that the predetermined conditions are met (in other words, when the automatic transmission 12 is likely to be maintained in the predetermined gear position), then the control routine proceeds to step 104. At step 104, the operative position of the manual valve 17 is switched to the D2 range position, and the hydraulic pressure supply route to the friction engagement elements 48 is switched to the bypass oil passages 50. As a result, hydraulic pressure is supplied to the friction engagement elements 48 to maintain the friction engagement elements 48 in an engaged state, but the hydraulic pressure supplied to the friction engagement elements 48 is not affected by the operation of the hydraulic control valves 14. Accordingly, the cleaning control operation may be performed on the hydraulic control valves 14.

Next, the control routine proceeds to step 105, where the cleaning control is performed to cause the hydraulic control valves 14 to perform the cleaning operation (e.g., an operation where a spool valve repeatedly reciprocates). As a result, foreign substances are expelled from the hydraulic control valves 14, and accumulation of foreign substances within the hydraulic control valves 14 may be prevented.

It should be noted that in order to improve the effectiveness of the cleaning control of the hydraulic control valves 14 in preventing foreign substance accumulation, it is desirable to increase an operation amount of the cleaning control of the hydraulic control valves 14 (e.g., a stroke amount of the reciprocation of a spool valve).

Figure 7:
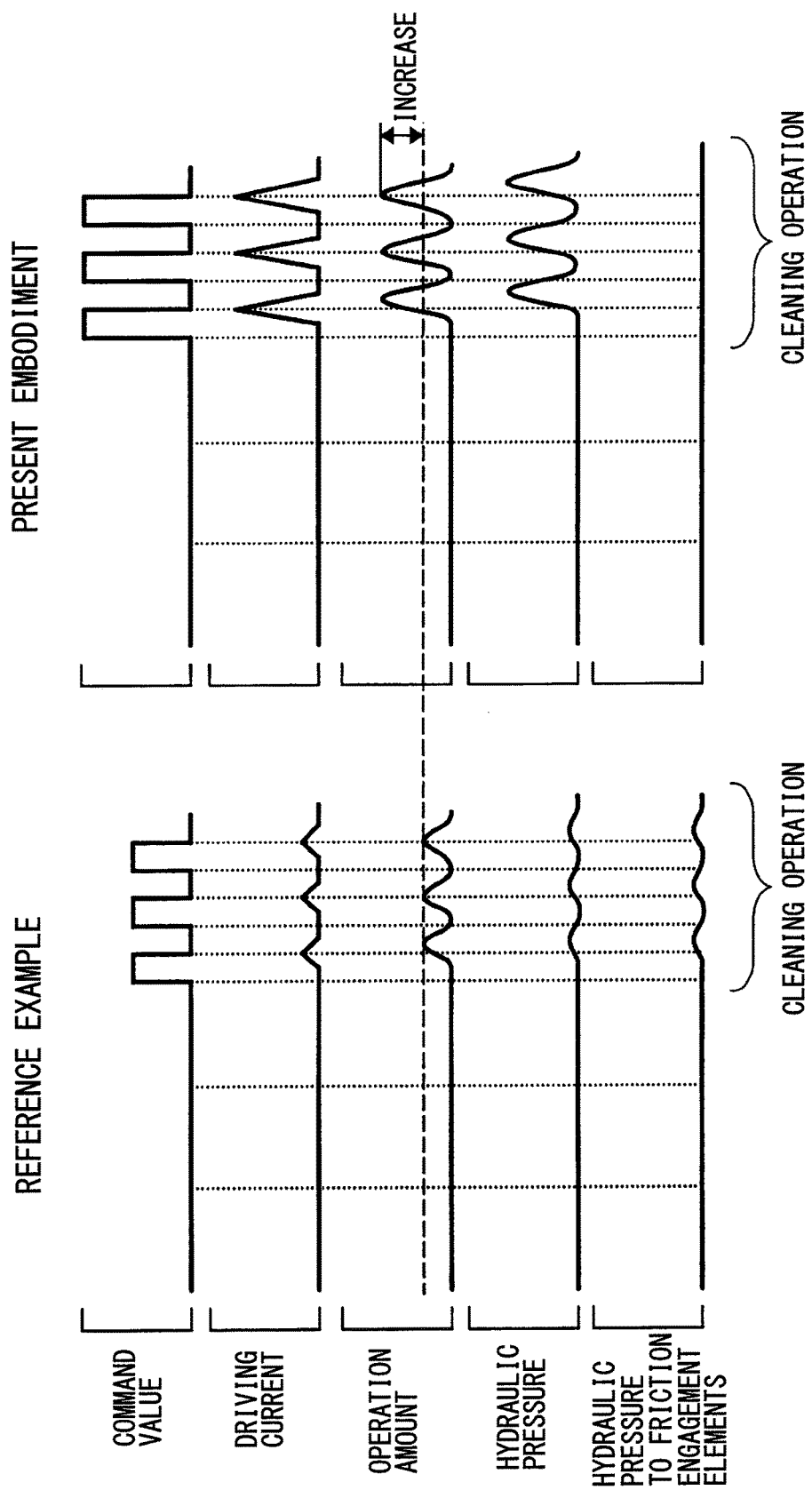
FIG. 7 is a time chart for explaining effects of the present embodiment.

In this regard, FIG. 7 shows a comparison between a reference example and the present embodiment. In the hydraulic control system of the reference example automatic transmission, as the operation amount of the hydraulic control valve cleaning control is increased, a hydraulic pressure applied to friction engagement elements is also increased accordingly. As a result, there is a chance that the friction engagement elements may malfunction. For this reason, as shown in FIG. 7 on the reference example side, it is necessary to suppress the operation amount of the hydraulic control valve cleaning control, in order to suppress fluctuations in the hydraulic pressure applied to the friction engagement elements so as to prevent malfunctions by the friction engagement elements. Accordingly, the operation amount of the hydraulic control valve cleaning control may not be increased, and the hydraulic control valve cleaning control may not sufficiently prevent foreign substance accumulation.

However, the present embodiment provides both the normal oil passages 49, which supply hydraulic pressure to the friction engagement elements 48 through the hydraulic control valves 14, as well as the bypass oil passages 50, which supply hydraulic pressure to the friction engagement elements 48 without passing through the hydraulic control valves 14. By switching the operative position of the manual valve 17, the hydraulic pressure supply route to the friction engagement elements 48 is switched between the normal oil passages 49 and the bypass oil passages 50.

Accordingly, by switching the hydraulic pressure supply route to the friction engagement elements 48 to the normal oil passages 49, the hydraulic control valves 14 are able to control the hydraulic pressure applied to the friction engagement elements 48. Conversely, by switching the hydraulic pressure supply route to the friction engagement elements 48 to the bypass oil passages 50, hydraulic pressure is supplied to the friction engagement elements 48, but this hydraulic pressure is not affected by the operation of the hydraulic control valves 14. In this case, as shown on the right side of FIG. 7, even when the hydraulic control valves 14 are performing the cleaning operation, the hydraulic pressure applied to the friction engagement elements 48 is unchanged. As a result, even if the operation amount of the hydraulic control valves 14 during the cleaning control is increased, malfunctions by the friction engagement elements 48 will not occur. Accordingly, without causing malfunctions by the friction engagement elements 48, the operation amount of the hydraulic control valves 14 during the cleaning control may be increased to improve the effectiveness of the cleaning control of the hydraulic control valves 14 in preventing foreign substance accumulation.

Moreover, the motor 27, which is a motive power source for the range switch mechanism 16, is used to switch the operative position of the manual valve 17 to switched between the normal oil passages 49 and the bypass oil passages 50. As a result, a dedicated motive power source for switching between the normal oil passages 49 and the bypass oil passages 50 is not necessary, and the system may further satisfy low cost and energy efficiency demands.

Further, in the present embodiment, the two-way balls 57 are provided at the merging portions 56 of the normal oil passages 49 and the bypass oil passages 50. Then, when switched to the normal oil passages 49, the hydraulic pressure in the normal oil passages 49 causes the two-way balls 57 to move to a position that closes the bypass oil passages 50, and when switched to the bypass oil passages 50, the hydraulic pressure in the bypass oil passages 50 causes the two-way balls 57 to move to a position that closes the normal oil passages 49.

Accordingly, when the operative position of the manual valve 17 is switched to the D1 range position to switch to the normal oil passages 49, the two-way balls 57 at the merging portions 56 open the normal oil passages 49 and close the bypass oil passages 50. Conversely, when the operative position of the manual valve 17 is switched to the D2 range position to switch to the bypass oil passages 50, the two-way balls 57 at the merging portions 56 open the bypass oil passages 50 and close the normal oil passages 49. As a result, without providing a new motive power source, the normal oil passages 49 and the bypass oil passages 50 may be opened and closed by the merging portions 56.

Moreover, in the present embodiment, the normal oil passages 49 and the bypass oil passages 50 are provided for the friction engagement elements 48 which are engaged when the automatic transmission 12 is in a predetermined gear position (e.g., first gear). Further, it is determined whether predetermined conditions are met such that the automatic transmission 12 is likely to remain in the predetermined gear position. If the predetermined conditions are not met, the operative position of the manual valve 17 is switched to the D1 range position. If the predetermined conditions are met, the operative position of the manual valve 17 is switched to the D2 range position.

Accordingly, when the predetermined conditions are not met (in other words, when the automatic transmission 12 is unlikely to be maintained in the predetermined gear position), the operative position of the manual valve 17 is switched to the D1 range position to switch to the normal oil passages 49. As a result, the hydraulic control valves 14 are able to control the hydraulic pressure applied to the friction engagement elements 48 to switch gear positions.

Conversely, when the predetermined conditions are met (in other words, when the automatic transmission 12 is likely to be maintained in the predetermined gear position), the operative position of the manual valve 17 is switched to the D2 range position to switch to the bypass oil passages 50. As a result, hydraulic pressure is supplied to the friction engagement elements 48 to maintain the friction engagement elements 48 in an engaged state, but the hydraulic pressure supplied to the friction engagement elements 48 is not affected by the operation of the hydraulic control valves 14. Accordingly, the cleaning control operation may be performed on the hydraulic control valves 14.

In addition, in the present embodiment, when the operative position of the manual valve 17 is switched to the D2 range position to switch to the bypass oil passages 50, the cleaning control is performed to cause the hydraulic control valves 14 to perform the cleaning operation. At that time, the hydraulic pressure supplied to the friction engagement elements 48 is not affected by the operation of the hydraulic control valves 14. In other words, even if the cleaning control is performed to cause the hydraulic control valves 14 to perform the cleaning operation, the hydraulic pressure applied to the friction engagement elements 48 is unchanged, and the cleaning control may be performed on the hydraulic control valves 14.

Further, in the present embodiment, the range switch mechanism 18 includes the detent lever 30 which is fixed to the manual shaft 29, the manual shaft 29 being coupled to the rotating shaft of the motor 27. The manual valve 17 is coupled to the detent lever 30 so as to linearly move according to the rotation of the detent lever 30. Accordingly, rotation by the rotating shaft of the motor 27 is converted into linear movement to drive the manual valve 17 in the axial direction.

Further, in the above described embodiment, the normal oil passages 49 and the bypass oil passages 50 are provided for the friction engagement elements 48 which are engaged when the automatic transmission 12 is in a predetermined gear position (e.g., first gear), thereby providing switchable oil passages. However, the above described embodiment is not limited to this, and additional normal oil passages and bypass oil passages may be provided for other friction engagement elements to provide switchable oil passages.

Further, in the above described embodiment, the SBW-ECU 23 performs the control routine of FIG. 6. However, the above described embodiment is not limited to this, and an ECU other than the SBW-ECU 23 (e.g., the AT-ECU 22 or the engine ECU 18) may perform the control routine of FIG. 6 instead.

Further, the above described embodiment is applied to a system including a range switch mechanism that switches between four shift ranges: the P range, the R range, the N range, and the D range. However, the above described embodiment of the present disclosure may instead be applied to a system including a range switch mechanism that switches between two shift ranges: a P range and "not P" range. Further, the above described embodiment of the present disclosure may also be applied to a system including a range switch mechanism that switches between three shift ranges, or between five or more shift ranges. Further, the above described embodiment of the present disclosure may also be applied to a system including a range switch mechanism that switches a transmission up and down using an electric actuator (e.g., a solenoid).

The invention claimed is:

1. A transmission hydraulics controller for a transmission including i) a manual valve that switches a hydraulic circuit for hydraulic oil of a friction engagement element of the transmission, ii) a hydraulic control valve that controls a hydraulic pressure applied to the friction engagement element, and iii) a range switch mechanism that is driven by an electric actuator and switches an operative position of the manual valve to switch a range of the transmission, the transmission hydraulics controller comprising:
- a normal oil passage that supplies hydraulic pressure to the friction engagement element through the hydraulic control valve; and
- a bypass oil passage that supplies hydraulic pressure to the friction engagement element while bypassing the hydraulic control valve, wherein
- when the operative position of the manual valve is switched, a hydraulic pressure supply route to the friction engagement element is switched between the normal oil passage and the bypass oil passage while maintaining the transmission in a particular range.

2. A transmission hydraulics controller for a transmission including i) a manual valve that switches a hydraulic circuit for hydraulic oil of a friction engagement element of the transmission, ii) a hydraulic control valve that controls a hydraulic pressure applied to the friction engagement element, and iii) a range switch mechanism that is driven by an electric actuator and switches an operative position of the manual valve to switch a range of the transmission, the transmission hydraulics controller comprising:
- a normal oil passage that supplies hydraulic pressure to the friction engagement element through the hydraulic control valve; and
- a bypass oil passage that supplies hydraulic pressure to the friction engagement element while bypassing the hydraulic control valve, wherein
- when the operative position of the manual valve is switched, a hydraulic pressure supply route to the friction engagement element is switched between the normal oil passage and the bypass oil passage,
- the normal oil passage merges with the bypass oil passage at a merging portion before connecting to the friction engagement element,
- a dynamic closure member is disposed in the merging portion, when switched to the normal oil passage, hydraulic pressure in the normal oil passage causes the dynamic closure member to move to a position that closes the bypass oil passage, and
- when switched to the bypass oil passage, hydraulic pressure in the bypass oil passage causes the dynamic closure member to move to a position that closes the normal oil passage.

3. A transmission hydraulics controller for a transmission including i) a manual valve that switches a hydraulic circuit for hydraulic oil of a friction engagement element of the transmission, ii) a hydraulic control valve that controls a hydraulic pressure applied to the friction engagement element, and iii) a range switch mechanism that is driven by an electric actuator and switches an operative position of the manual valve to switch a range of the transmission, the transmission hydraulics controller comprising:
- a normal oil passage that supplies hydraulic pressure to the friction engagement element through the hydraulic control valve;
- a bypass oil passage that supplies hydraulic pressure to the friction engagement element while bypassing the hydraulic control valve; and
- a control unit, wherein
- when the operative position of the manual valve is switched, a hydraulic pressure supply route to the friction engagement element is switched between the normal oil passage and the bypass oil passage,
- the control unit
  - determines whether predetermined conditions are met, the transmission being likely to be maintained in a predetermined gear position when the predetermined conditions are met,
  - when the predetermined conditions are not met, switches the operative position of the manual valve to a first operative position that switches to the normal oil passage, and
  - when the predetermined conditions are met, switches the operative position of the manual valve to a second operative position that switches to the bypass oil passage, and
- the friction engagement element is engaged when the transmission is in the predetermined gear position.

4. The transmission hydraulics controller of claim 3, wherein
- the control unit, when switching the operative position of the manual valve to the second operative position, performs a cleaning control that causes the hydraulic control valve to perform a cleaning operation.

5. The transmission hydraulics controller of claim 1, wherein
- the electric actuator is a motor,
- the range switch mechanism includes a detent lever fixed to a manual shaft, the manual shaft being coupled to a rotating shaft of the motor, and
- the manual valve is coupled to the detent lever so as to linearly move according to a rotation of the detent lever.

* * * * *